US006907578B2

(12) United States Patent
Wilson et al.

(10) Patent No.: US 6,907,578 B2
(45) Date of Patent: Jun. 14, 2005

(54) USER INTERFACE FOR RECEIVING INFORMATION VIA A TRANSMISSION MEDIUM

(75) Inventors: Scott H. Wilson, Dallas, TX (US); Todd W. Minnis, Dallas, TX (US)

(73) Assignee: Ignite Technologies, Inc., Dallas, TX (US)

( * ) Notice: Subject to any disclaimer, the term of this patent is extended or adjusted under 35 U.S.C. 154(b) by 853 days.

(21) Appl. No.: 09/745,937

(22) Filed: Dec. 21, 2000

(65) Prior Publication Data

US 2002/0083138 A1 Jun. 27, 2002

(51) Int. Cl.[7] .............................................. G09G 5/00
(52) U.S. Cl. .................... 715/837; 715/808; 715/809
(58) Field of Search ............................... 345/835, 837; 715/835, 837, 808, 809, 810

(56) References Cited

U.S. PATENT DOCUMENTS

| | | | | |
|---|---|---|---|---|
| 5,617,526 A | * | 4/1997 | Oran et al. ................. 345/779 |
| 5,727,174 A | * | 3/1998 | Aparicio et al. ............ 345/837 |
| 5,737,557 A | * | 4/1998 | Sullivan ..................... 345/765 |
| 5,777,616 A | * | 7/1998 | Bates et al. ................. 345/837 |
| 5,913,040 A | | 6/1999 | Rakavy et al. |
| 6,055,510 A | * | 4/2000 | Henrick et al. .............. 705/14 |
| 6,057,841 A | * | 5/2000 | Thurlow et al. ............ 345/809 |
| 6,396,518 B1 | * | 5/2002 | Dow et al. .................. 345/772 |
| 6,469,722 B1 | * | 10/2002 | Kinoe et al. ................ 345/837 |
| 6,622,160 B1 | * | 9/2003 | Horvitz ...................... 709/206 |
| 6,624,831 B1 | * | 9/2003 | Shahine et al. ............. 345/815 |
| 2001/0054059 A1 | * | 12/2001 | Marks et al. ............... 709/201 |

OTHER PUBLICATIONS

Habraken, Joe. "Sams Teach Yourself Microsoft Outlook 98 in 10 min". 1998. Macmillan Computer Publishing.*

* cited by examiner

Primary Examiner—John Cabeca
Assistant Examiner—Ting Zhou
(74) Attorney, Agent, or Firm—Haynes and Boone, LLP

(57) ABSTRACT

Disclosed herein is a computer-implemented method for interfacing with a resident application of a computer system. Upon receipt of a data file in a background space of the computer system, a user interface having plural command interfaces is generated. By selecting a first one of the plural command interfaces, an instruction is issued to the resident application. If a first one of the command interfaces is selected, the data file is transferred to a foreground space of the computer system and opened. Conversely, by selecting a second one of the plural command interfaces, the data file is deleted without opening or transfer to the foreground space.

12 Claims, 7 Drawing Sheets

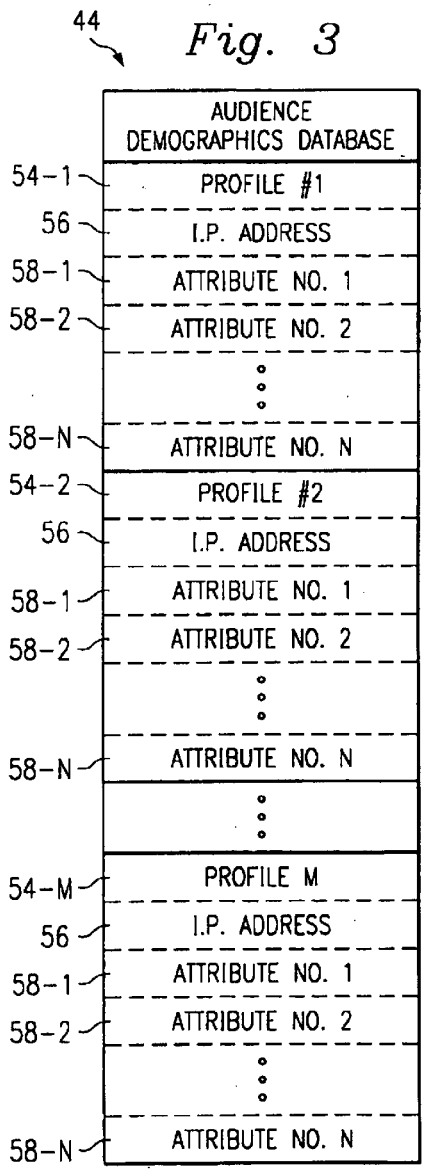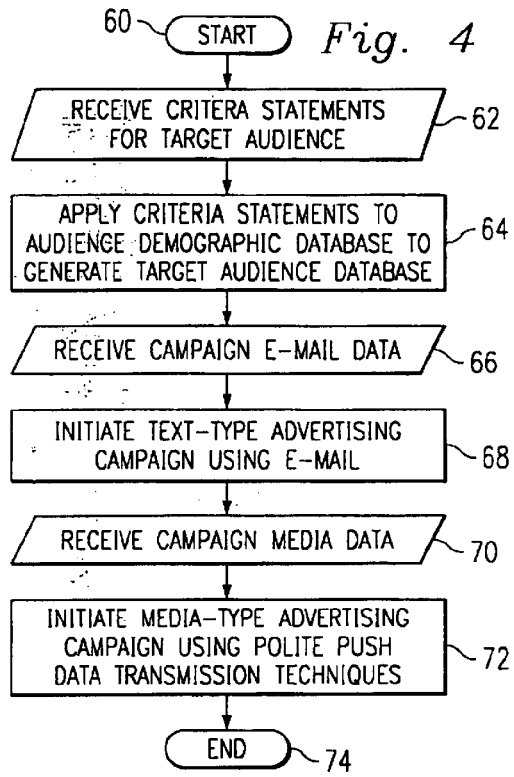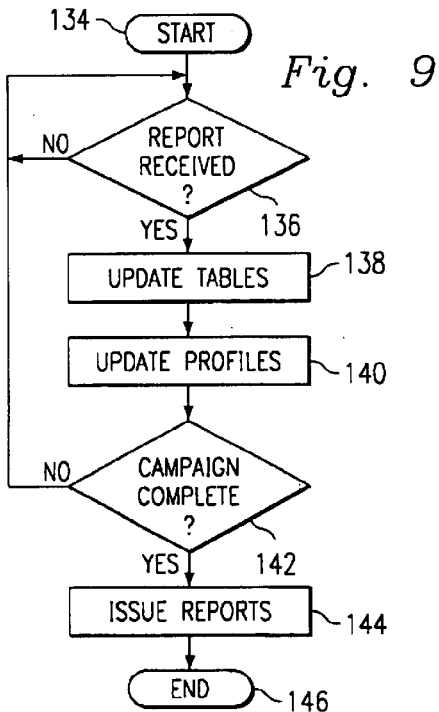

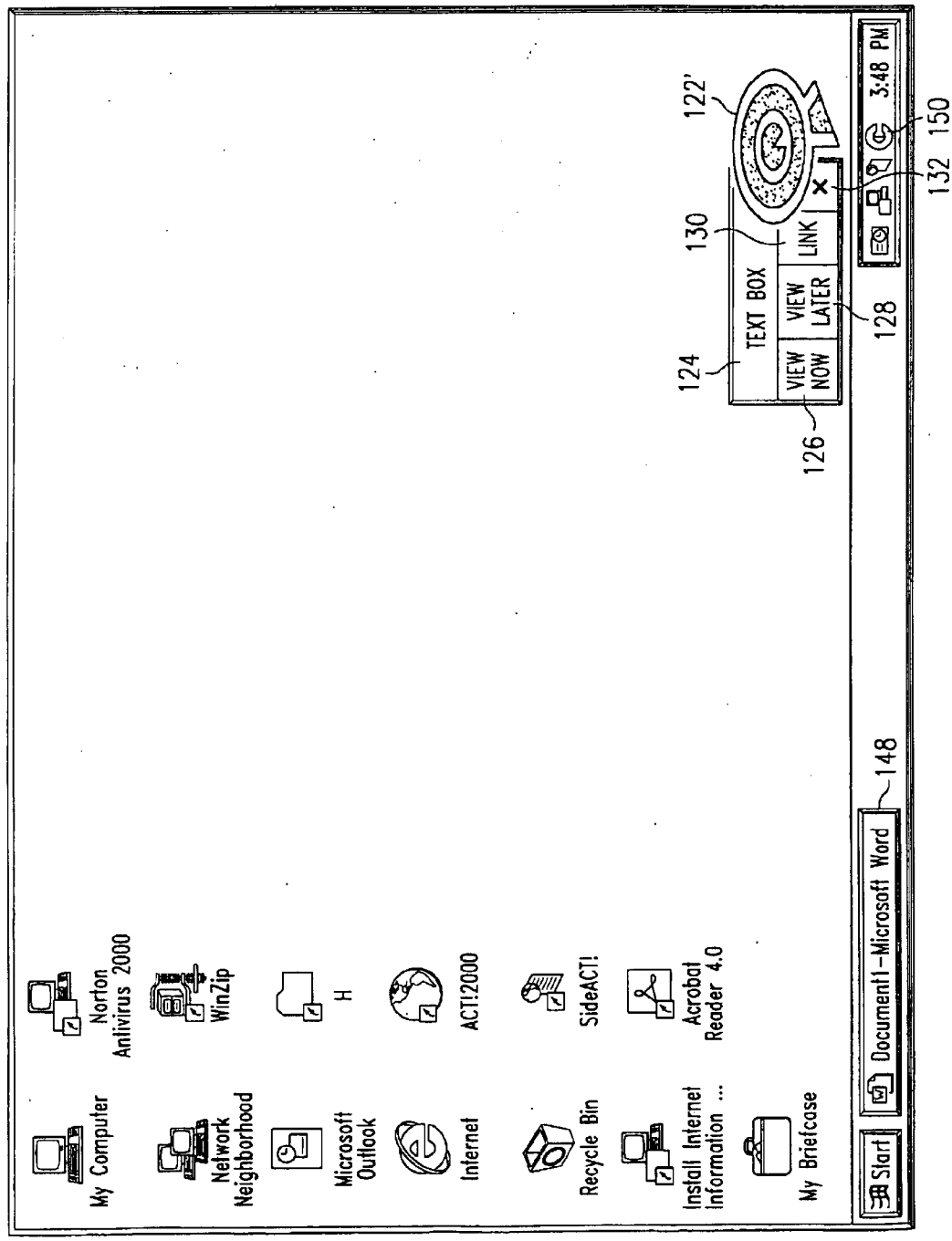

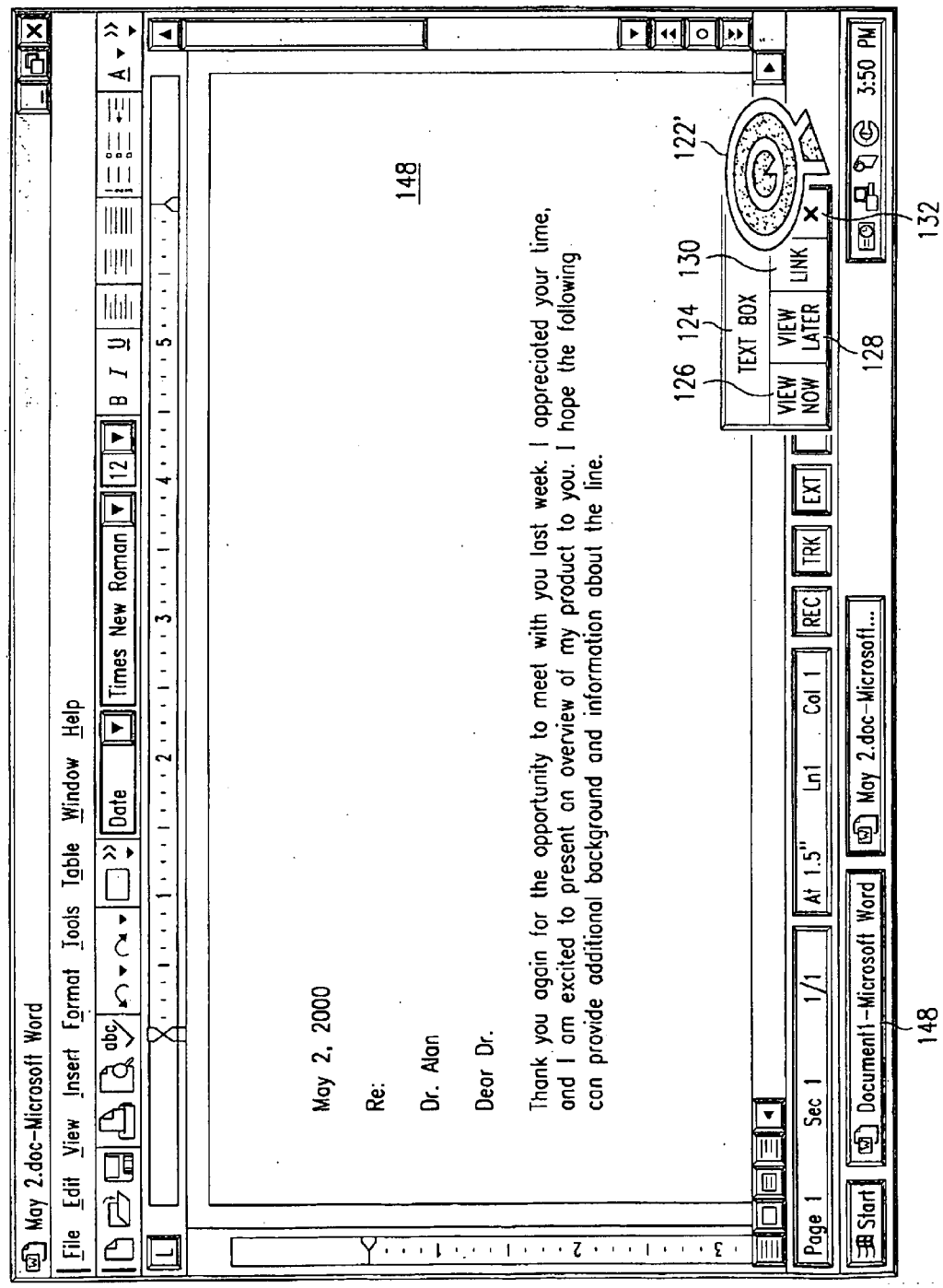

USER INTERFACE FOR RECEIVING INFORMATION VIA A TRANSMISSION MEDIUM

TECHNICAL FIELD

The invention relates generally to a user interface for a computer and more particularly to a user interface for controlling the handling of downloaded information such as advertisements received over an electronic transmission medium such as the Internet.

BACKGROUND

Recently, considerable attention has been focused on advertising over the Internet. While various techniques have been used to advertise goods or services over the Internet, the most popular of these is commonly referred to as "banner" advertising. In banner advertising, a portion of a web page accessed by computer users is dedicated to one or more advertisements for goods or services offered by a third party. Typically, all or part of the banner advertisement also functions as a button which, when depressed, immediately links the computer user to the advertiser's web site where additional information on the product or service is maintained.

Despite its prevalence on many web sites, banner advertising has been less than successful. One drawback is that, in contrast to other advertising mediums such as television where the audience is passively viewing programs and advertisements being broadcast, most computer users on the Internet are actively searching for content for review. As a result, by responding to a banner displayed on an opened page, the computer user must temporarily discontinue the very activity which initiated their search. Thus, unlike other advertising mediums, on the Internet, members of the target audience often resist clicking through to view the entire content of the advertisement being distributed. For example, some studies have shown that about 0.05% of computer users exposed to a banner advertisement respond to the particular ad.

Furthermore, depending on the speed at which a user clicks through a web page containing a banner during their search for content, some advertisements, particularly those that lack any eye-catching features, may barely be noticed by the members of the target audience. However, visually enhanced advertisements, for example, advertisements that incorporate full motion video or audio, which are more likely to draw a user's attention away from their original task, are often unsuitable for these uses since the download time for such advertisements would significantly slow a user's computer. As a result, the very visual enhancements which would make banner advertisements more appealing could also very easily alienate the very audience with whom an advertiser seeks to promote their goods or services.

U.S. Pat. No. 5,913,040 to Rakavy et al. is directed to a method and apparatus for transmitting and displaying information between a remote network and a local computer. Rakavy et al. discloses a data transmission technique commonly known as "polite push" in which data is transmitted from the remote network to the local computer only when utilization of the communications link between the two drops below a pre-established threshold value. By transmitting data in this manner, Rakavy et al. seeks to minimize the interference which a download of a full-motion video or other large data file from the remote network can cause with an Internet search or other use of the communications link by the local computer. Rakavy et al. further contemplates that polite push data transmission techniques may be used in an advertising application which takes user preferences into account. Specifically, Rakavy et al. discloses a database in which advertisements and user preferences are maintained and an advertisement display manager which selects and displays advertisements downloaded from the database.

While Rakavy et al. discloses the use of polite push technology for downloading advertisements to local computers and of selecting advertisements for display based upon user preferences, Rakavy et al. has failed to fully exploit either of these concepts. It is, therefore, the object of this invention to apply user preferences and polite push data transmission techniques to advertising mediums which involve the transfer and display of advertisements over a network such as the Internet.

SUMMARY

Disclosed herein is a computer-implemented method for interfacing with a resident application of a computer system. Upon receipt of a data file in a background space of the computer system, a user interface having plural command interfaces is generated. By selecting a first one of the plural command interfaces, an instruction is issued to the resident application. If a first one of the command interfaces is selected, the data file is transferred to a foreground space of the computer system and opened. Conversely, by selecting a second one of the plural command interfaces, the data file is deleted without opening or transferring to the foreground space.

In a further aspect thereof, a notification icon may be generated upon arrival of the data file and, upon selection thereof, the notification icon converts into the user interface. In still further aspects thereof, a third command interface, a fourth command interface, a text box and/or another notification icon are also generated. Upon selecting the third command interface, the opening of the data is delayed for a selected time period. Conversely, upon selecting the fourth command interface, a browser which establishes a bi-directional communication link to a specified Internet address is opened. While unopenable, the text box contains information describing the received data file. Finally, if a pair of notification icons are generated, a first notification icon is generated upon initiation of the arrival of the data file while a second notification icon is generated upon completion of the arrival of the data file. The first notification icon may have a reduced size relative to the second notification icon.

Also disclosed herein is a computer-implemented user interface for opening a media file transmitted to a background space of a computer system via a network using a polite push data transmission technique. The user interface is comprised of first and second command interfaces, the selection of a first one thereof causes the transfer of the received media file to a foreground space of the computer systems where it is opened while the selection of a second one thereof causes the media file to be deleted without opening or transfer to the foreground space. The user interface may further comprise a third command interface and/or a fourth command interface. The selection of the third command interface delays the opening of the media file for a selected time period. Selection of the fourth command interface, on the other hand, establishes a link with an address associated with an originator of the media file. As disclosed herein, the first, second, third and fourth command interfaces all form part of a first level icon of a user interface which includes first and second level icons. By selecting the second level icon, the user drills down to the first level icon.

Further disclosed herein is a computer-implemented user interface for opening a media file, transmitted to a background space of a computer system by a remote application, using a polite push data transmission technique. The user interface comprises a first and second selectable command interface and a notification application coupled to the first and second command interfaces. By selecting the first or second command interface, an application residing on the computer system initiates a first or second operation on the media file, respectively. The notification application, on the other hand, transmits a notification to the remote application upon selection of either the first selectable command interface or the second selectable command. At the remote application, an evaluation of an advertising campaign being at least partially conducted by transmitting the media file to the computer system is constructed using the notifications issued by the notification application in response to selection of either the first or second selectable command interfaces. If the first command interface is selected, the media file is opened and a notification of the opening is issued. Similarly, if the second command interface is selected, the media file is deleted and a notification of the deletion prior to opening thereof is issued. Selection of the first command may also cause a transfer of the media file to a foreground space of the computer system before opening thereof while selection of the second command interface may cause the resident application to delete the media file without transfer thereof to the foreground space.

It is further disclosed that the user interface may also include a third and/or a fourth selectable command interface. Selection of the third command interface causes the resident application to delay, for a selected period of time, the transfer of the media file to the foreground space for opening thereof. Selection of the third command interface may also cause the notification application to issue a notification of a delay in opening the media file. Selection of the fourth command interface, on the other hand, causes the resident application to establish a bi-directional communication link with an Internet address associated with an originator of the media file. Like the notifications of openings and deletions, the notification of delays and linkings may also be used to construct the evaluation of the advertising campaign.

Finally, also disclosed is a computer-implemented user interface for opening a media file transmitted to a background space of a computer system using a polite push data transmission technique which comprises means for generating an icon in a foreground space of the computer system in response to receipt of the media file by the computer system in the background space thereof, means for generating at least one command interface in response to an operator of the computer system selecting the icon and means for initiating execution of a first operation on the media file while the media file remains in the background space of the computer system by selecting a first one of the at least one command interface. This particular user interface may also include means for issuing, in response to the selection of the first command interface, a notification to a remote application where the notifications are used to construct an evaluation of an advertising campaign being at least partially conducted by transmitting the media file to the computer system.

BRIEF DESCRIPTION OF THE DRAWINGS

FIG. 3 is a block diagram of an audience demographics database used by the server of FIG. 2a to construct a campaign database describing members of an audience to be targeted during an advertising campaign.

FIG. 4 is a flow chart of a method by which the server of FIG. 2a implements an advertising campaign utilizing polite push data transmission techniques to deliver media to members of the targeted audience.

FIG. 7 is a first graphical illustration of a user interface accessible through the notification icon of FIG. 6, as it appears when accessed in the absence of an application running in a foreground space of the computer system of FIG. 2 and through which the member of the targeted audience controls the media delivered thereto.

FIG. 8 is a second graphical illustration of the user interface of FIG. 7, as it appears when accessed while an application is running in the foreground.

FIG. 9 is a flow chart of a method of analyzing the results of an advertising campaign implemented in accordance with the method of FIG. 4.

DETAILED DESCRIPTION

Figure 1:
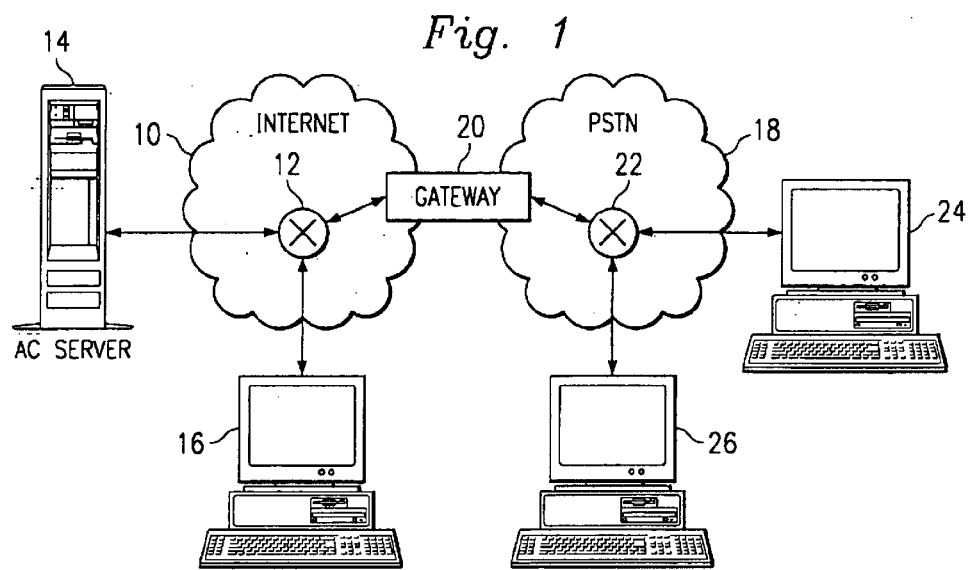
FIG. 1 is a block diagram of a data transmission network having, as a first node thereof, a server suitable for implementing advertising campaigns utilizing polite push data transmission techniques and for analyzing results of the advertising campaigns implemented thereby and having, as a second node thereof, a computer system suitable for receiving media delivered thereto as part of the advertising campaign implemented by the server.

Turning now to the drawings, in FIG. 1, the reference numeral 10 designates a large composite computer network. While, in the embodiment disclosed herein, the computer network 10 is the Internet, it is fully contemplated that a wide variety of other types of local or wide area networks ("LANS" or "WANS") are suitable for the uses contemplated herein. It should be readily appreciated that the Internet 10 is comprised of a plurality of nodes, at each of which one or more of a wide variety of devices reside. However, for ease of illustration, only one such node, specifically, node 12, is shown in FIG. 1. Of course, it should be clearly understood that the foregoing description of the Internet 10 and the various devices which reside at nodes thereof has been greatly simplified and that numerous technical details not necessary for an understanding of the invention have been omitted. It should be further understood that, strictly speaking, advertising campaign ("AC") server 14 and personal computer ("PC") 16 are Internet nodes but are shown in FIG. 1 as being outside the Internet 10 since the AC server 14 and the PC 16 variously operate as the point of origination and/or point of destination in data exchanges.

Node 12 is a router which, as will be more fully described below, routes data between locations, typically, between nodes, within the Internet 10. Both the AC server 14 and the PC 16 are shown as having a direct connection to the router 12 of the Internet 10. Of course, the manner in which the AC server 14 and the PC 16 are connected to the Internet 10, as well as whether one or both of the AC server 14 and the PC 16 have permanent or temporary connections to the Internet 10 would depend on a number of factors, including the respective computing power of the AC server 14 and the PC 16 and the respective financial resources of the operator of the AC server 14 and the PC 16. The AC server 14 is a larger scale computer with sufficient processing and memory capacity to host a web site, maintain various databases and perform the processing, data transfer and Email messaging functions described herein. The PC 16 is a standard minitower, desktop, laptop or similarly sized computer having, as minimum system requirements, the Windows 95, 98, NT or 2000 operating system, all of which are commercially available through Microsoft Corporation of Redmond, Wash., a Pentium microprocessor manufactured by Intel Corporation of Santa Clara, Calif. (or, alternately, any non-Intel microprocessors having similar operating speeds), 64 megabytes ("MB") of random access memory ("RAM"), 20 MB of available space on the auxiliary memory, an Internet connection, either direct or dialup, and a web browser such as Netscape Navigator 4.0 (or higher) manufactured by Netscape Communications Corporation of Mountain View, Calif. or Microsoft Explorer 4.0 (or higher) manufactured by Microsoft Corporation of Redmond, Wash. Of course, the PC 16 is shown in FIG. 1 as being directly coupled to the node 12 merely for ease of illustration. In most configurations, the physical connection between the PC 16 and the node 12 would be through one or more intermediate devices such as a larger scale computing device such as those operated by an Internet service provider ("ISP").

Gateway 20 interconnects the Internet 10 with public switched telephone network ("PSTN") 18. Like the Internet 10, FIG. 1 also illustrates the PSTN 18 in a highly simplified form in which only one device, here, switch 22, of a multitude of devices which collectively form the PSTN 18 is shown. Coupled to the switch 22 are PCS 24 and 26, both of which should have minimum system requirements similar to that of the PC 16. Of course, the PCS 24 and 26 are shown in FIG. 1 as being directly coupled to the switch 22. In actuality, however, the PCS 24 and 26 are coupled to the switch 22 through one or more devices, including a regional Bell operating company (or "RBOC"). As will be more fully described below, and in a manner similar to that of the PC 16, the PCS 24 and 26 variously operate as the point of origination or point of destination for data exchanges with the AC server 14.

It should be clearly understood that the present disclosure of three PCS, specifically, the PCS 16, 22 and 24, as members of a target audience of an advertising campaign initiated by the AC server 14 is purely by way of illustration and that a typical advertising campaign would be directed to a target audience comprised of thousands of members in addition to the three members of the target audience specifically illustrated herein. Further, while all of the illustrated members of the target audience are PCS, it is fully contemplated that other types of computer systems, as well as other intelligent devices, for example, PDAs, capable of receiving and displaying data received from a computer network and having an interface from which a user may transmit data and/or commands to a device residing on the computer network, may also be designated as members of a target audience of an advertising campaign. Finally, while the present disclosure further provides that all of the computer-implemented initiations and analysis of advertising campaigns are executed by software residing in the AC server 14, it is fully contemplated that one or more databases accessed or processes executed thereby may be off-loaded from the AC server 14.

Figure 2B:
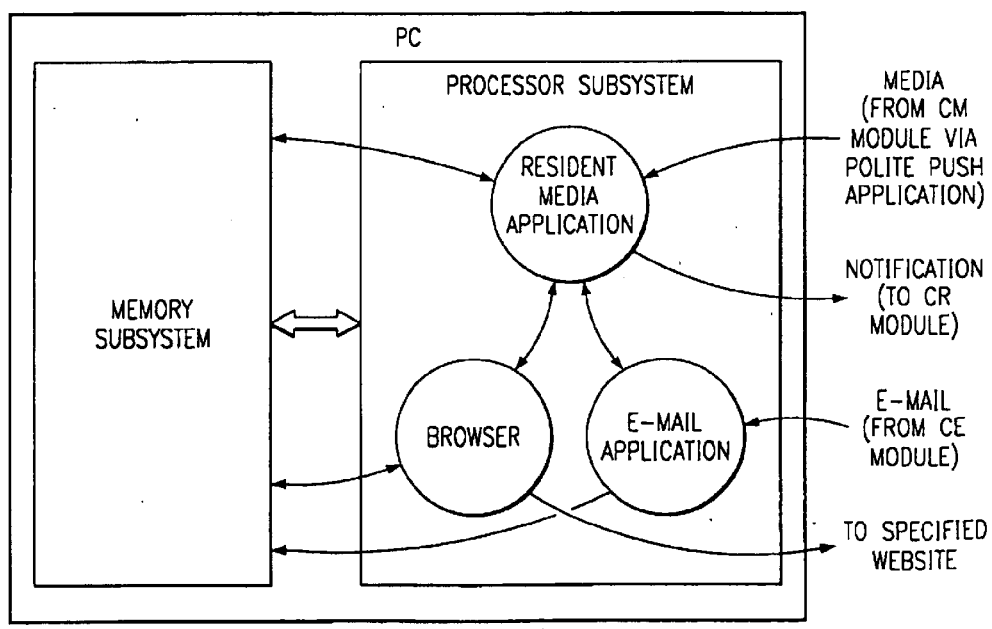
FIG. 2b is an expanded block diagram of the computer system of FIG. 1.
Figure 2A:
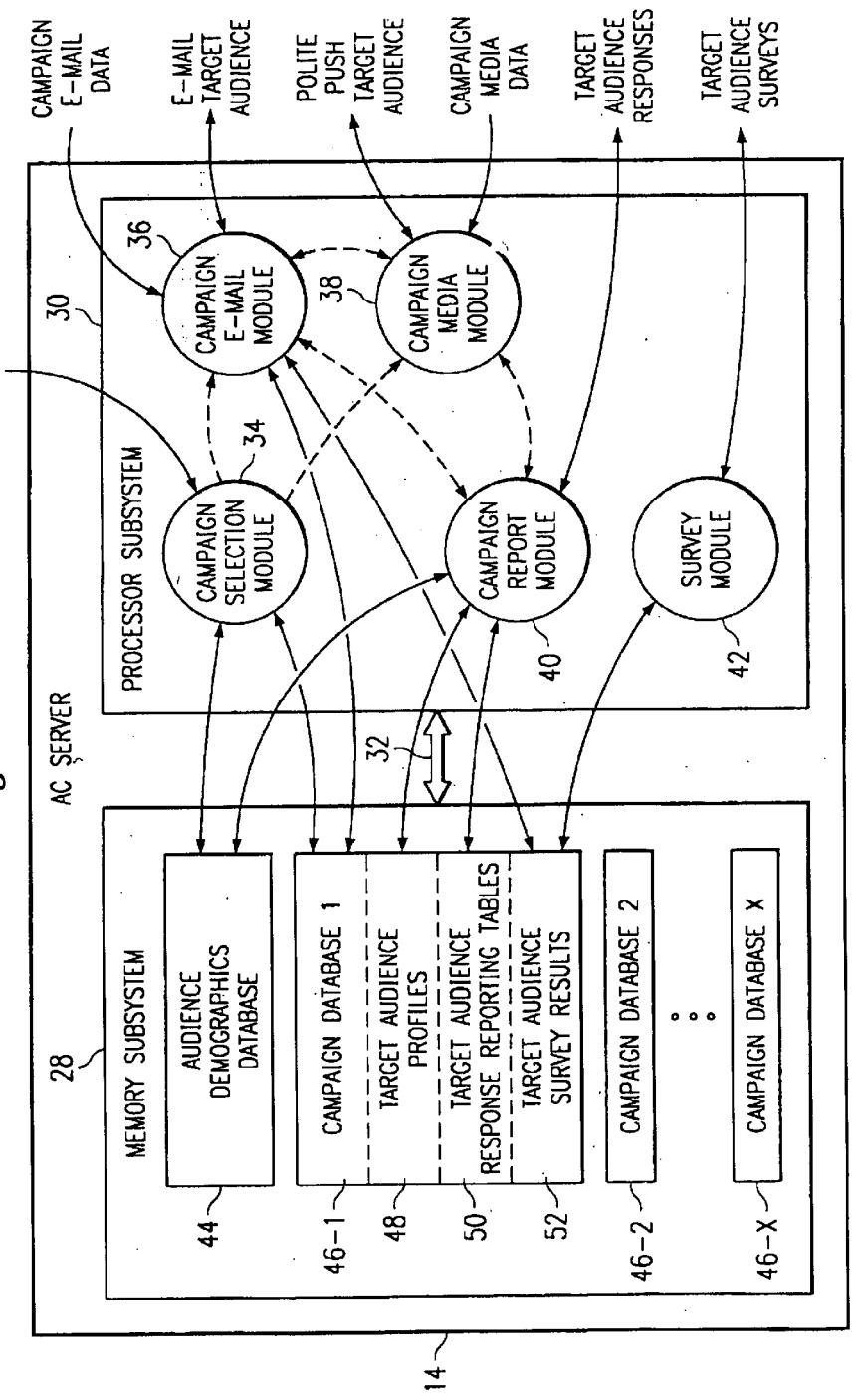
FIG. 2a is an expanded block diagram of the server of FIG. 1.

Referring next to FIG. 2a, the AC server 14 will now be described in greater detail. As may now be seen, the AC server 14 is a computer system having at least one port (not shown) for coupling to the router 12 or other devices of the Internet 10 via a transmission medium (not shown) such as a twisted pair of conductors. The AC server 14 includes a processor subsystem 28 sized to execute plural applications of the types described herein, including, but not limited to, applications for assembling a target audience for an advertising campaign, initiating one or more passive push-type advertising campaigns, initiating one or more E-mail-type advertising campaigns, providing interaction between associated passive push-type and E-mail-type advertising campaigns, processing requests for additional information received from members of the target audience, processing information received from members of the target audience, analyzing responses received from the target audience, evaluating the results of the advertising campaign, updating contents of one or more databases based upon the results of the advertising campaign and generating reports on the results of the advertising campaign.

A memory subsystem 28 is coupled to the processor subsystem 30 by a bidirectional address, data and control bus 32. Of course, various components and/or devices which typically form part of a computer system such as the AC server 14 have been omitted from FIG. 3 for ease of illustration. Further, those components of the AC server 14 which are illustrated in FIG. 2a have been greatly simplified for ease of description. Thus, by the term "processor subsystem", it is intended to refer to the collective processing capability within the AC server 14. As such, it is fully contemplated that the processor subsystem 30 encompasses plural processing devices and/or circuits variously located within the AC server 14. Similarly, by the term "memory subsystem", it is intended to refer to the total available memory space within the AC server 14. As such, it is fully contemplated that the memory subsystem 28 encompasses all of the main, auxiliary, as well as any cache memories, within the AC server 14. Typically, information frequently needed by the processor subsystem 30 is stored in a main memory of the memory subsystem 28 while information less frequently needed by the AC server 30 is stored in an auxiliary memory of the memory subsystem 28. Finally, for most computer systems, the main memory resides on a local bus while the auxiliary memory resides on the system bus, typically either an industry standard architecture (or "ISA") bus, an extended ISA (or "EISA") bus or a peripheral connection interface (or "PCI") bus. Accordingly, it should be readily apparent that the address, data and control bus 32 encompasses the various local and system buses within the AC server 14.

Residing on the processor subsystem 30 are plural software applications, hereafter referred to as "software modules". As illustrated herein, the software modules include a campaign selection ("CS") module 34, a campaign Email ("CE") module 36, a campaign media ("CM") module 38, a campaign report ("CR") module 40 and a survey ("S") module 42. It should be noted that, while FIG. 2a is illustrated such that it appears that the CS module 34, the CE module 36, the CM module 38, the CR module 40 and the S module 42 are all discrete components of the processor subsystem 30, like the vast majority of software currently in use, the various software modules 34–42 are all maintained in the memory subsystem 28, typically, in the auxiliary memory thereof, until executed by the main processor unit, typically, a microprocessor, of the processor subsystem 30. It should be further understood that, while FIG. 2*a* is illustrated such that it further appears that the various software modules 34–42 are each discrete software modules of the processor subsystem 30, by no means should FIG. 2*a* be interpreted as requiring that each of the various software modules 34–42 be discrete applications. Typically, a software module such as any one of the CS, CE, CM, DR and S modules 34, 36, 38, 40 and 42 is comprised of a sequence of plural lines of code arranged in the order of execution. Accordingly, it is contemplated that, rather than constructing each of the CS, CE, CM, DR and S modules 34, 36, 38, 40 and 42 as separate applications, each of the software modules 34–42 may instead merely be a sub-routine of a single application that incorporates the functionality of each of the illustrated modules. Furthermore, while each of the SC, CE, CM, CR and S modules 34, 36, 38, 40 and 42 are illustrated as residing within the processor subsystem 30, such illustration should not be interpreted as requiring that all of the software modules 34–42 are executed by a common component, typically, the microprocessor, of the processor subsystem 30. Rather, it is fully contemplated that the execution of one or more of the software modules 34–42 may be off-loaded to another component or device. For example, depending on the size and design of an advertising campaign, the respective processing demands of the CE and CM modules 36 may be too great for both modules to be executed simultaneously by the microprocessor. Accordingly, it may be considered advantageous to off-load at least one software module, for example, the CM module 38 onto a discrete processing device or even a discrete board (not shown), for example, a daughter board, coupled to the processor subsystem 30 by the address, data and control bus 32.

As will be more fully described below in connection with FIGS. 2*b*, 3–9, each of the software modules 34–42 provide certain functionality useful in conducting an advertising campaign using the Internet as the broadcast medium for the campaign. The CS module 34 constructs a specific database which describes a target audience for an advertising campaign from a larger audience demographics database and a set of criteria for the target audience. The CE module 36 initiates a first portion of an advertising campaign to be directed towards a first selected portion of the target audience to be contacted. To initiate the Email portion of the campaign, the CE module 36 accesses campaign Email data and the campaign database constructed by the CS module 34 and initiates the transmission of Email messages contained in the Email data to the first portion of the targets identified in the campaign database. Similarly, the CM module 38 initiates a second portion of an advertising campaign to be directed towards a second selected portion of the target audience to be contacted. To initiate the second portion of the advertising campaign, the CM module 34 accesses the campaign database constructed by the CS module 34 and campaign media data. The CM module 38 then initiates a polite push-style advertising campaign to be described in much greater length below to distribute the campaign media to the second portion of the targets identified in the campaign database. As Emails are not particularly size-intensive, the campaign Email data transmitted to each target identified in the first portion of the campaign database, it is contemplated that the campaign media data would typically include full-motion video or other types of space-intensive multimedia presentations. As it is contemplated that sizable amounts of campaign media data shall be transmitted to each target identified in the second portion of the campaign database, a polite push data transmission technique which delivers information files in the background is recommended. Of course, the use of a polite push data transmission is purely exemplary and it is specifically contemplated that other data transmission techniques, particularly those which minimize any effects on the PC while the PC receives the data transmission, may be used in conjunction with the present invention.

As disclosed herein, both the CE module 36 and the CM module 38 obtain the target audience from the campaign database, for example, by polling the campaign database upon initiating an advertising campaign. In an alternate configuration shown in phantom in FIG. 2*a*, the CS module 34 transmits the first and second portions of the campaign database to the CE and CM modules 36 and 38, respectively, upon construction thereof. However, such a configuration would typically be less preferred because it is often desirable for the constructed campaign database to be reviewed, for example, for clearly erroneous databases which may possibly be inadvertently constructed if the target audience criteria has one or more logical errors in the target audience criteria used to construct the campaign database.

The CR module 40 receives all responses generated by the various members of the target audience upon receiving a data transmission forming part of the advertising campaign. As is more fully described below, for the Email advertising campaign initiated by the CE module 36, the expected responses to the Email advertising campaign would be one of the following: "Email returned", "Email received by target, no follow-up requested" and "Email received by target, follow-up requested." Of course, use of a more sophisticated Email system could increase the number of different responses which may be received to include responses such as "Email received and deleted without opening", "Email received, opened and deleted" and "Email received and opened" as well as other possible responses. For the media advertising campaign, the possible responses from members of the target audience receiving the advertisement include the following: "package received", "package viewed", "package deleted" and "action taken." As before, the possible responses by the recipient of the target audience set forth herein are purely exemplary and it is fully contemplated that the CM module 38 may be constructed such that a wide variety of other responses to the media campaign are possible.

Upon receipt of responses from members of the target audience, the CR module may take any one of a number of actions. The primary action taken by the CR module is to log the responses by writing the received responses to the target audience response reporting table. As disclosed herein, the received responses are entered into the target audience reporting tables based upon time of receipt for the response. The CM module 40 also compiles the received responses into a report. For example, the reports generated may include counts of the number of responses received, average time elapsed between time of delivery and time of response. Again, it should be noted that the disclosed reports are purely exemplary and that any type of report may be generated using the responses received by the CR module 40. It is further contemplated that the CR module 40 may use various techniques to generate reports. For example, preselected report formats such as "Total number of Responses" may be placed in the target audience response reporting tables and, each time the CR module receives a response, the CR module 40 may simply increment the count of total number of responses being maintained within the target audience reporting table. Alternately, the CR module 40 may process the received data into a reportable format and then write the processed data to the target audience response reporting tables. For example, if the pre-selected report format maintained in the target audience reporting tables was "Percentage of target audience responding", upon receiving a response, the CR module 40 would retrieve the total number of responses from the target audience response reporting tables, increment the response by one, retrieve the total number of target members in the audience, determine the percentage of target members who have responded and write the determined percentage back to the target audience response reporting tables.

In addition to generating reports for use in analyzing the effectiveness of the conducted advertising campaign, the responses received by the CR module 40 are also used to update the audience demographics database and/or the campaign database. For example, if a media transmission is returned before delivery, the IP address from the demographics database may be outdated. As a result, the IP address corresponding to the returned electronic transmission should be deleted from both the audience demographics database and the campaign database.

The S module 42 is an interactive software module, which, while illustrated as forming part of the processor subsystem 30, may readily be located elsewhere. Generally, the campaign media data transmitted to each member of the target audience gives that member the opportunity to request a survey. If the member of the target audience agrees to take a survey, the survey module 42 generates plural questions, each of which is answered by the member of the target audience. The responses are compiled by the survey module 42 and transmitted to the target audience survey results portion of the memory subsystem 28.

Continuing to refer to FIG. 2a, the memory subsystem 28 will now be described in greater detail. As may now be seen, residing within the memory subsystem 28 are an audience demographics database 44 and plural advertising campaign databases 46-1 through 46-X. The audience demographics database 44 is comprised of plural entries, each containing information describing a person or other entity who may be selected as a member of a target audience for an advertising campaign. The memory subsystem further includes memory spaces or databases for target audience profiles 48, target audience response reporting tables 50, and target audience survey results 52. As will be more fully described below, the CS module 34 constructs a campaign database which identifies each member of the target audience for an advertising campaign by selecting plural entries from the audience demographics database 44 and then assembling the selected entries (or portions thereof) into a campaign database.

Referring to FIG. 2b, another block diagram is shown for illustrating other module contained in the processor subsystem 30. In addition to the modules described with regard to FIG. 2a, the processor subsystem 30 also has a resident media application module 47 that interacts with various other modules or subsystems. For example, it receives media inputs from the campaign media (CM) module 38 via the polite push application. It further sends notifications to the campaign report (CR) module 40. Further, it interacts or communicates with other modules such as a browser module 48 and an email application module 49. The resident media application module 47, the browser module 48 and the email application module 49 all have access to the memory subsystem 28, and connects to other related modules such as the campaign email module 36.

Referring momentarily to FIG. 3, the audience demographics database 44 from which a campaign database may be assembled will now be described in greater detail. As shown, the audience demographics database mainly contains a series of audience profiles 54-1 to 54-M. Each profile has various predetermined attributes, the number of the attributes being expandable. Taking Profile #1 (54-10) for example, there is an I.D. Address attribute storing the identity and the address of a particular member of the audience. Attributes 58-1 to 58-N in Profile #1 can be used to store various types of information relating to the same member of the audience. It is obvious that if more attributes are included, more information is at hand to understand the member.

Referring now to FIG. 4, a flow diagram is shown illustrating a high level process for generating an advertising campaign utilizing polite push data transmission techniques to deliver media to members of a targeted audience. After the process is initiated in step 60, criteria statements for a target audience is received in step 62. Information derived from the criteria statements are applied to the audience demographic database in order to generate a target audience database. The members in the target audience database meet the predetermined requirements of the criteria statements. In step 66, campaign email data is further received, and then a text-type advertising campaign is initiated using email in step 68. After receiving campaign media data in step 70, a media-type advertising campaign using the polite push data transmission techniques are initiated in step 72.

Figure 5:
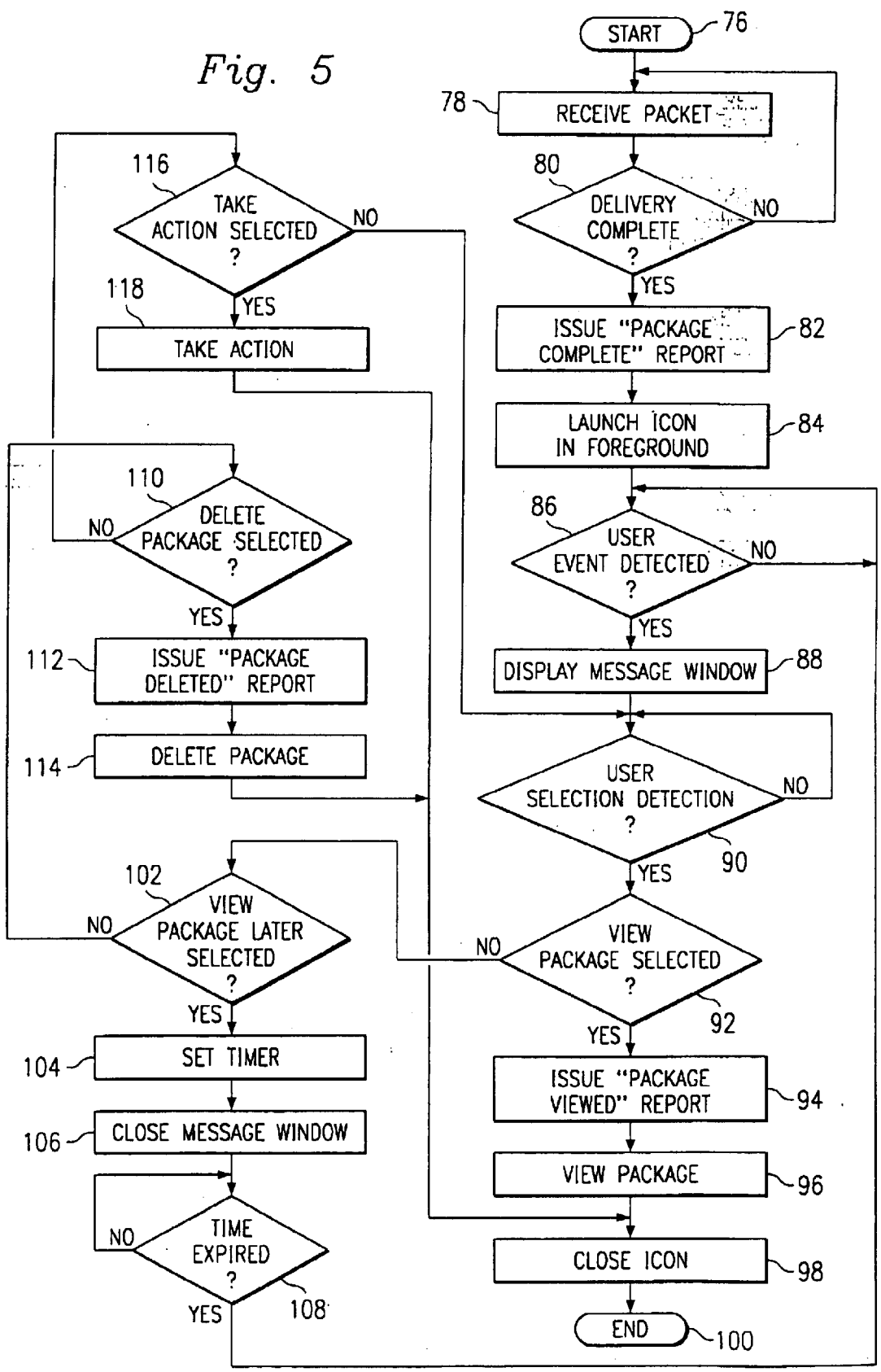
FIG. 5 is a flow chart of a method by which each member of the targeted audience may control media delivered thereto during an advertising campaign implemented in accordance with the method of FIG. 4.

Referring to FIG. 5, it illustrates a flow chart of a method by which each member of the targeted audience may control media delivered thereto during an advertising campaign implemented in accordance with the method described in FIG. 4. For illustration purposes, it is assumed that a PC is used by a member of a targeted audience for receiving media data of the advertising campaign. It is understood that various receiving devices can also be used. Once a process starts in step 76, the PC will receive the delivered media data in the form of packets in step 78. An application resident to the PC running in the background first checks continuously to see whether the delivery is complete in step 80. If so, a "package complete" report is issued in step 82, and a predetermined icon is then launched in the foreground on a display of the PC so that the member's attention can be called. The icon is not activated until a user event is detected in step 86, and if the member decides to check the information available as represented by the displayed icon, a message window will be brought up in step 88. Step 90 is running continuously to detect whether a user selection is detected. If so, it is checked to see whether the member has viewed the package selected in step 92. If the member so desires, a "package viewed" report is issued in step 94, and the package is viewed in step 96. The icon is subsequently closed in step 98, and the process comes to a full stop in step 100. If back in step 92, the member does not want to view the package immediately, it would be checked to see whether the member desires to view the package later in step 102. A timer is set in step 104 if the member indicates that he/she may come back and view the package in a predetermined time period. The message window is then closed in step 106, and a constant detection will be made to see whether the time period set by the timer expires in step 108. If the time expires, the user event detection process in step 86 is again activated. However, if in step 102, the member indicates that he/she would not view the package in the near future, then an opportunity is provided to the member to decide whether the selected package should be deleted permanently in step 110. If so, a "package deleted" report is issued in step 112 and the package is deleted permanently from the PC in step 114. Further from step 110, if the member doesn't want to delete the package, he/she can go back to the display message window or take actions in step 118.

Figure 6:
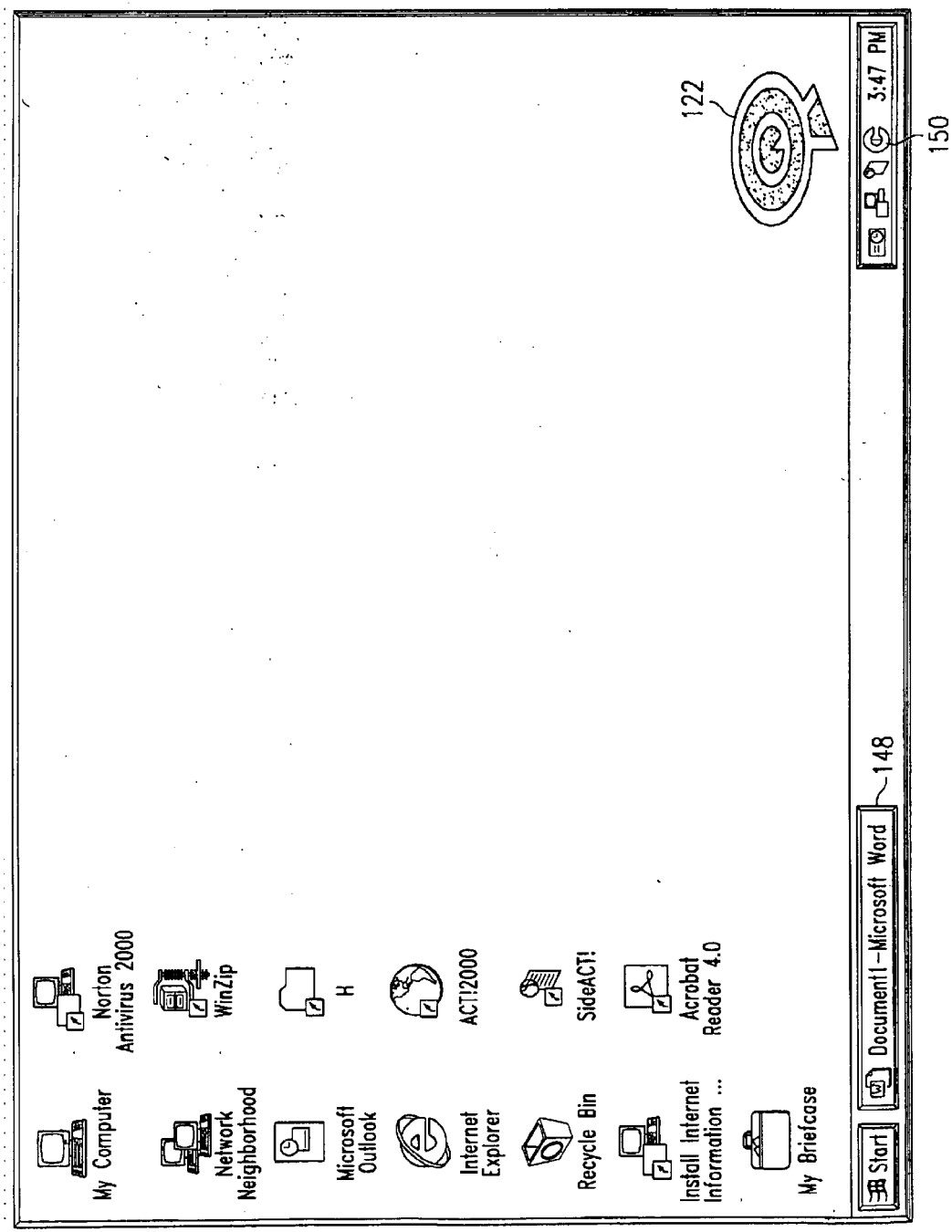
FIG. 6 is a graphical illustration of a "pop-up" icon used to notify a member of the targeted audience of the delivery of media thereto.

Referring next to FIGS. 6–8, a pop-up notification icon 122 which notifies a computer user of an incoming delivery of media forming part of an advertising campaign for which the computer user has been targeted and an associated user interface 122' enables the computer user to control the delivered media will now be discussed in greater detail. As may now be seen, the computer user is notified of the media file by the appearance of the notification icon 122 on the computer screen 120. The notification icon 122 should be graphically designed to immediately draw the attention of the computer user. For example, in FIG. 6, the notification icon 122 appears as a multi-colored, highly stylized bulls eye and arrow design. Of course, it is fully contemplated that a wide array of designs may be used as the notification icon 122. Also, to enhance the attention-getting abilities of the notification icon 122, it is contemplated that the notification icon 122 be configured to always appear in the foreground of the computer screen 120 regardless of what other applications are running when the notification icon 122 is generated. Alternately, the notification icon 122 may be accompanied by an audio file which generates an audible sound to call the computer user's attention to the delivery of the media.

It is further contemplated that the notification icon 122 may be standardized for all advertising campaigns or customized for each advertising campaign. If standardized, the notification icon 122 may be stored with the advertising campaign application which is installed on the computer system for which a user has agreed to received targeted advertising campaigns. If customized, for example, to incorporate the corporate logo of the organization conducting the advertising campaign, the entire notification icon 122 (or, at the very least, that portion of the notification icon 122 which is customized) should be delivered with the media. Of course, to provide both options, the installed application may include a default notification icon which will be generated by the application if the delivered media does not include a substitute notification icon 122. It is contemplated that one advantage of using customized notification icons is that the computer users forming the targeted audience may use the knowledge that they derive from the notification icon 122 to decide whether or not to view the delivered media. For example, if the notification icon conveyed to the computer user that the advertising campaign for which media had been delivered was directed to new automobiles and that particular computer user had recently purchased a new automobile, it is highly unlikely that the computer user would be interested in viewing advertisements for goods that they are not considering purchasing.

In alternate configurations thereof, the resident application may be configured such that the notification icon 122 appears when delivery of the media begins, for example, when the arrival of a first packet of media data is detected or when the delivery is complete, for example, when the arrival of a last packet of media data is detected. While it is often desirable to notify the computer user upon start of the arrival of media data, there are a number of advantages to generating the notification icon 122 upon completion of delivery. For example, on occasion, part of the media being delivered may be unusable due to added noise occurring during transmission. In such circumstances, a portion of the media data may need to be resent before the delivered media may be executed. Similarly, because the speed at which the media is delivered varies depending on how heavily the computer user is receiving and/or transmitting data over the transmission medium, delivery of the media may require much longer than normally expected. Thus, by delaying the appearance of the notification icon 122 until delivery is complete and integrity of the delivered media is checked by the resident application, any irritation caused by the resident application being unable to execute the delivered media upon receiving such a request from the computer user before the resident application is ready to process such a request is avoided. Of course, the notification icon 122 may incorporate both options. For example, the notification icon 122 may flash to indicate that delivery of the media is on-going and turn solid when ready to execute.

As disclosed herein, the notification icon 122 appears upon initiation of delivery of media, flashes while delivery of the media is on-going and provides no user interface functions such as allowing the computer user to terminate delivery of the media before delivery is complete. When delivery is complete, the notification icon 122 changes appearance, for example, changing from a flashing image to a solid image and is converted, by the resident application, to user interface 122' shown in FIGS. 7 and 8. The user interface 122' is similar in appearance to the notification icon 122 but, unlike the notification icon 122, if the computer user attempts to access the user interface 122', for example, using a "point and click" operation using a mouse, upon detecting the attempted access, the resident application opens dialog box 124.

As illustrated herein, the dialog box 124 is comprised of a single text box 124 and first, second, third and fourth graphical interfaces 126, 128, 130 and 132. For example, each of the graphical command interfaces 126, 128, 130 and 132 may be comprised of a "button", the depression of which will cause the resident application to execute a command which appears on the button in natural language readily understandable by the computer user. Of course, the dialog box 124 may include any number of text boxes and/or graphical interfaces as necessitated by the needs of the advertiser sponsoring the media campaign. In the embodiment disclosed herein, the text box 124 is filled with the corporate logo of the advertiser, and a brief remark intended to remind the computer user of the type of media delivered to the resident application and to generate interest in viewing it. For example, an automobile manufacturer rolling out a new car line targeted at consumers in their early 20's, the text box 124 may contain a message such as "Want to experience the all-new 699 by ABC Automakers?"

As further illustrated herein, the user interface 122' further includes four graphical command interfaces, each constructed as a button. Actuating the first command interface 126 causes the first command interface 126 to issue an instruction to the resident application to execute the media package delivered to the resident application. Actuating the second command interface 128 causes the second command interface 128 to issue an instruction to the resident application to close the user interface 122' and notification icon 122, set a timer to a preselected time period, for example, 1 hour, and, upon expiration of the time period, to re-open the user interface 122'. Actuating the third command interface 130 causes the third command interface to issue a command to the resident application to open an Internet browser and go to a specified web address. Finally, actuation of the fourth command interface 132 closes the user interface 122' and the notification icon 122 without setting the timer.

It is contemplated that each of the command interfaces 126, 128, 130 and 132 should be relatively simple and not configured to initiate the execution of plural commands, for example, by attaching a command sub-menu to one or more of the command interfaces 126, 128, 130 and/or 132. Of course, such a alternate configuration may be readily achieved if desired. It is, however, further contemplated that at least one or more of the command interfaces 126, 128, 130 and/or 132 be tied to an intermediate interface, typically, to confirm an issued instruction. For example, rather than merely tying the fourth command interface 132 to an instruction to close the notification icon 122 and the user interface 122', the fourth command interface 132 can also be tied to a command to delete the received media without viewing. However, before the received media is deleted, it may be desirable to generate a screen issuing a warning as to the nature of the command issue and requesting a confirmation of the issued command.

A close examination of the computer screen 120 reveals that the computer system on which the notification icon 122 and user interface 122' reside is operating on a conventional Windows 95/98 platform. However, it is fully contemplated that, by a relatively straightforward recoding thereof, the notification icon 122 and user interface 122' may be configured to operate on other platforms such as the Windows NT/2000, VME or Linux platforms. As may be further seen in either of FIGS. 6 or 7, as indicated by the other full-size icons visible on the computer screen 120, plural other applications also reside on the computer system. A number of minimized icons located in the system tray further indicate which of these applications have been retrieved from auxiliary memory and placed in RAM while one application, here, the "Word" application currently available through Microsoft Corporation of Redmond, Washington has also been opened and then minimized.

Thus, in both FIGS. 6 and 7, while the notification icon 122 and the user interface 122' are generated in the foreground of the computer screen 120, since no other applications are running when these images are generated, it may not be readily apparent that the notification icon 122 and the user interface 122' are both configured to always open in the foreground of the c computer screen 120, regardless of what other applications are running simultaneously therewith. However, in FIG. 8, the Word application is running in the foreground when both the notification icon 122 (and subsequently, the user interface 122' are launched. As may now be seen, both the notification icon 122 and the user interface 122' are configured to launch in front of any other applications. For example, in FIG. 8, the user interface 122' has launched in front of the Word application 148

Referring next to FIG. 9, it illustrates a method of analyzing the results of an advertising campaign implemented in accordance with the method described in FIG. 4. Starting from step 134, an analysis process is initiated. It is checked in step 138 to see whether a recent report has been received. If so, the tables and profiles in the databases are updated in steps 138 and 140. If the entire campaign is determined to be completed in step 142, then at least one final report is issued in step 144 and thus conclude the process. If the campaign is still ongoing, the process routes back to step 136 to monitor any new added reports.

Although illustrative embodiments of the invention have been shown and described, other modifications, changes, and substitutions are intended in the foregoing disclosure. Accordingly, it is appropriate that the appended claims be construed broadly and in a manner consistent with the scope of the invention.

What is claimed is:

1. A computer-implemented user interface for opening a media file transmitted to a background space of a computer system via a network using a polite push data transmission technique, comprising:

a first command interface, the execution of which transfers said media file to a foreground space of said computer system and opens said media file;

a second command interface, the execution of which deletes said media file without opening said media file or transferring said media file to said foreground space;

a third command interface, the execution of which delays opening of said media file for a selected time period; and a fourth command interface, the execution of which establishes a link with an address associated with an originator of said media file;

wherein said first, second, third and fourth command interfaces all form part of a first level icon, and further comprising:

a second level icon, the selection of which drills down to said first level icon.

2. The user interface of claim 1, wherein selection of said fourth command interface opens a browser and commands said browser to link to said address.

3. The user interface of claim 1, wherein said user interface further comprises a text box in which information describing said received media file is contained.

4. The user interface of claim 1, wherein said media file is an advertisement for goods or services that are the subject of an advertising campaign.

5. The user interface of claim 1, wherein a survey resides at said address.

6. The user interface of claim 1, further comprising an initial icon displayed upon initiation of said arrival of said media file, said second level icon being displayed upon completion of said arrival of said media file.

7. The user interface of claim 6, wherein said initial icon has a reduced size relative to said second level icon.

8. The user interface of claim 1, further comprising a notification application coupled to said first and second command interfaces, said notification application transmitting a notification to a remote application upon selection of either said first command interface or said second command interface, said remote application constructing an evaluation of an advertising campaign being at least partially conducted by transmitting said media file to said computer system, said evaluation being constructed using notifications issued by said notification application in response to selection of either said first or second command interfaces.

9. The user interface of claim 8, wherein:

selection of said first command interface causes said notification application to issue a notification of an opening of said transmitted media file; and selection of said second command interface causes said notification application to issue a notification of a deletion of said transmitted media file prior to opening thereof.

10. The user interface of claim 8, wherein selection of said third command interface, causes said notification application to issue a notification of a delay in opening said media file, said remote application constructing said evaluation of said advertising campaign using said notifications issued upon selection of said third command interface.

11. The user interface of claim 8, wherein said remote application constructing said evaluation of said advertising campaign uses information received during interchanges conducted after establishment of said link with said address.

12. The user interface of claim 1, wherein the execution of the third command interface causes said first level icon to close and then to automatically re-open at the end of said selected time period.

* * * * *